US011902891B2

United States Patent
Wei et al.

(10) Patent No.: US 11,902,891 B2
(45) Date of Patent: Feb. 13, 2024

(54) APPARATUS AND METHOD FOR NETWORK SLICING AND SLICE MANAGEMENT TO SUPPORT MULTI-SLICE SERVICES

(71) Applicant: Huawei Technologies Duesseldorf GmbH, Duesseldorf (DE)

(72) Inventors: Qing Wei, Munich (DE); Riccardo Trivisonno, Munich (DE); Chenghui Peng, Shanghai (CN)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/997,579

(22) Filed: Aug. 19, 2020

(65) Prior Publication Data
US 2020/0383043 A1    Dec. 3, 2020

Related U.S. Application Data (63) Continuation of application No. PCT/EP2018/054039, filed on Feb. 19, 2018.

(51) Int. Cl.
*H04W 48/18* (2009.01)
*H04L 67/146* (2022.01)
(Continued)

(52) U.S. Cl.
CPC ........... *H04W 48/18* (2013.01); *H04L 67/146* (2013.01); *H04W 24/04* (2013.01); *H04W 28/24* (2013.01)

(58) Field of Classification Search
CPC ..... H04W 48/18; H04W 24/04; H04W 76/20; H04W 72/08; H04W 28/24; H04L 67/146
See application file for complete search history.

(56) References Cited

U.S. PATENT DOCUMENTS

2018/0019871 A1*  1/2018  Gage .................... G06F 21/6209
2018/0192471 A1*  7/2018  Li ............................ H04W 4/50
(Continued)

FOREIGN PATENT DOCUMENTS

CN        106921977 A      7/2017
CN        107580360 A      1/2018
(Continued)

OTHER PUBLICATIONS

"Project Name:5G Novel Radio Multiservice adaptive network Architecture (5G NORMA), Deliverable D5.1 Definition of connectivity and QoE/QoS management mechanisms—intermediate report," Project: H2020-ICT-2014-2 5G NORMA, total189 pages (Nov. 30, 2016).
(Continued)

*Primary Examiner* — Syed Ali
(74) *Attorney, Agent, or Firm* — Leydig, Voit & Mayer, Ltd.

(57) ABSTRACT

The present disclosure provides an apparatus for network slicing, and an apparatus for network slice management, which are usable to support and optimize multi-slice services. The apparatuses provide functional enhancements within different layers of a network architecture. The apparatus for network slicing is configured to determine at least two correlated communication traffic flows for a service, and to bind the at least two correlated communication traffic flows. Further, it is configured to generate, and preferably expose, binding information. The apparatus for network slice management is configured to convert a service requirement of a tenant/application into a joint performance parameter in correlated network slice instances. Further, it is configured to determine a resource allocation for at least one of the network slice instances based on the joint performance parameter.

19 Claims, 9 Drawing Sheets

(51) Int. Cl.
*H04W 24/04* (2009.01)
*H04W 28/24* (2009.01)

(56) References Cited

U.S. PATENT DOCUMENTS

| | | | | |
|---|---|---|---|---|
| 2018/0288198 | A1* | 10/2018 | Pope | H04L 41/16 |
| 2019/0141081 | A1* | 5/2019 | Kunz | H04W 8/04 |
| 2019/0158408 | A1* | 5/2019 | Li | H04L 45/306 |
| 2019/0158985 | A1* | 5/2019 | Dao | H04W 28/04 |
| 2019/0222491 | A1* | 7/2019 | Tomkins | H04L 41/0823 |
| 2019/0223250 | A1* | 7/2019 | Dao | H04W 76/22 |
| 2020/0169865 | A1* | 5/2020 | Sirotkin | H04W 76/11 |
| 2020/0267753 | A1* | 8/2020 | Adjakple | H04W 72/1268 |
| 2020/0280562 | A1* | 9/2020 | Salkintzis | H04L 67/306 |

FOREIGN PATENT DOCUMENTS

| | | |
|---|---|---|
| WO | 2017123938 A1 | 7/2017 |
| WO | 2017143047 A1 | 8/2017 |
| WO | 2017166988 A1 | 10/2017 |

OTHER PUBLICATIONS

"3rd Generation Partnership Project; Technical Specification Group Services and System Aspects; Study on Architecture for Next Generation System (Release 14)," 3GPP TR 23.799 V14.0.0, total 522 pages, 3rd Generation Partnership Project, Valbonne, France (Dec. 2016).

L. Geng et al.,"COMS Architecture draft-geng-coms-architecture-01," Internet-Draft; Intended status: Informational, total 13 pages (Jan. 30, 2018).

"FG IMT-2020: Report on Standards Gap Analysis," International Telecommunication Union Telecommunication Standardization Sector, Study Group 13; TD 208 (PLEN/13), Study Period 2013-2016, total 172 pages (Jun. 12, 2016).

"3rd Generation Partnership Project; Technical Specification Group Services and System Aspects; System Architecture for the 5G System; Stage 2 (Release 15)," 3GPP TS 23.501 V15.0.0, total 181 pages, 3rd Generation Partnership Project, Valbonne, France (Dec. 2017).

"3rd Generation Partnership Project; Technical Specification Group Services and System Aspects; Procedures for the 5G System; Stage 2 (Release 15)," 3GPP TS 23.502 V15.0.0, total 258 pages, 3rd Generation Partnership Project, Valbonne, France (Dec. 2017).

Rost et al., "Project: H2020-ICT-2014-2 5G NORMA, Project Name: 5G Novel Radio Multiservice adaptive network Architecture (5G NORMA), Deliverable D3.1 Functional Network Architecture and Security Requirements," v1.0, Total 60 pages (Dec. 31, 2015).

"3rd Generation Partnership Project; Technical Specification Group Services and System Aspects; Policy and Charging Control Framework for the 5G System; Stage 2 (Release 15)," 3GPP TS 23.503 V15.0.0, pp. 1-56, 3rd Generation Partnership Project, Valbonne, France (Dec. 2017).

* cited by examiner

APPARATUS AND METHOD FOR NETWORK SLICING AND SLICE MANAGEMENT TO SUPPORT MULTI-SLICE SERVICES

CROSS-REFERENCE TO RELATED APPLICATIONS

This application is a continuation of International Application No. PCT/EP2018/054039, filed on Feb. 19, 2018, the disclosure of which is hereby incorporated by reference in its entirety.

STATEMENT OF FUNDING

The project leading to this application has received funding from the European Union's 5G-MoNArch programme under grant agreement No 761445.

TECHNICAL FIELD

The present disclosure relates to an apparatus and to a method for network slicing, in particular for identifying and exploiting correlations between communication traffic flows for network slice instances. Further, the present disclosure relates to an apparatus for network slice management, in particular for a joint performance management of correlated network slice instances.

BACKGROUND

The network slicing concept is introduced in 5G to address the various different requirements from multiple vertical industries assuming a shared network infrastructure (i.e. resources, devices, physical links, etc.). Network services can be customized based on the requirements of different use cases, and thus the network operation efficiency can be increased. In 5G networks, services are implemented via network slices. The network slices are instantiated and managed by the network management system.

Figure 7:
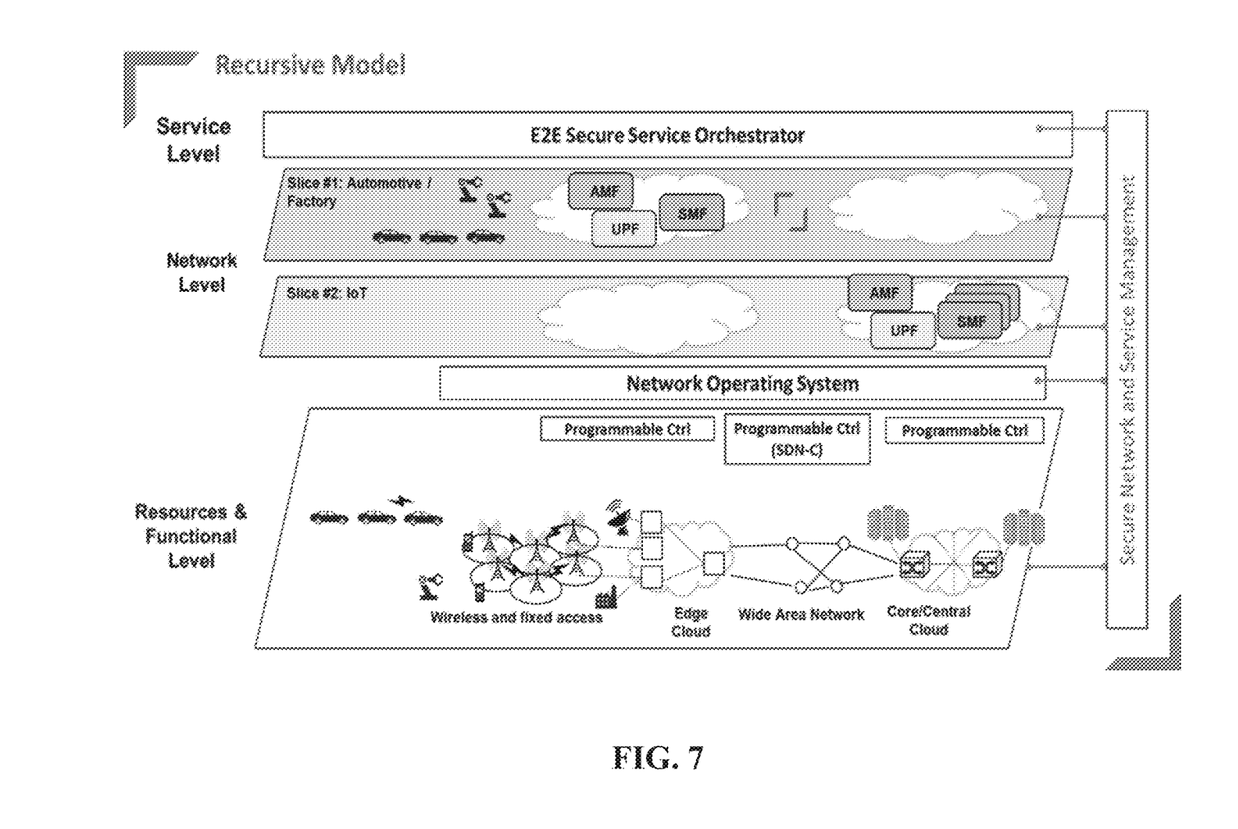
FIG. 7 shows the overall 5G architecture identified by 5G-PPP Phase 1 projects.

The 5G Infrastructure Public Private Partnership (5GPPP) architecture working group (WG) summarizes the overall 5G slicing architecture identified by the 5GPPP phase 1 project, which is shown in FIG. 7, as follows: "At the service level, the slice provider offers a northbound interface (NBI) to tenants where they can request/modify/monitor/control their slices according to the service-level agreements (SLAB) with the slice provider. At the network level, this implies that such on-demand NFs can be tailor-made for different devices based the level of support needed. The network operating system maps logical network slices to the "resources and functional" level, e.g., using various (programmable) controllers, but also virtualization techniques"

Figure 8:
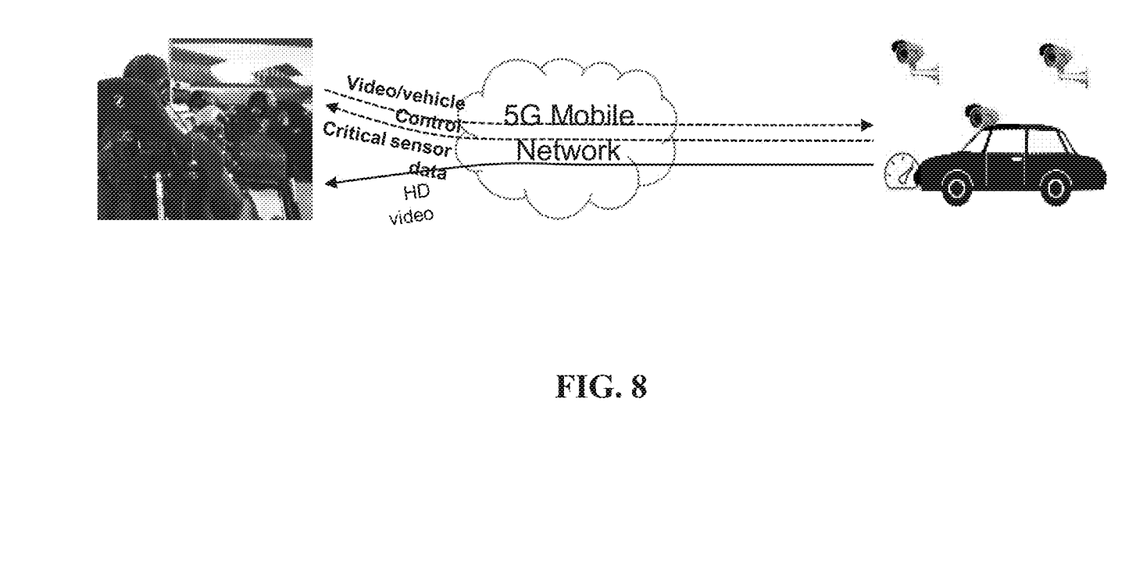
FIG. 8 shows a use case for remote driving including the communication of HD video data and of vehicle sensor data.

The 3rd Generation Partnership Project (3GPP) defines some basic network slice types, e.g. enhanced Mobile Broadband (eMBB), massive Machine-Type Communication (mMTC), or Ultra Reliable Low Latency Communications (URLLC), wherein each network slice type is designed for a group of services sharing similar service requirements. However, some applications/services may require the network features implemented by multiple network slice types at the same time. For instance, in a remote driving case, as it is shown in FIG. 8, High Definition (HD) video data requires high throughput, which may be supported by the eMBB slice. At the same time, on-vehicle sensor data and vehicle control signaling require low latency but high reliability, which may be supported by the URLLC slice. Similarly, Virtual Reality (VR)/Augmented Reality (AR) applications may require an eMBB slice to transfer HD video contents, and at the same time may require a URLLC slice to transfer critical sensor data (e.g. header direction), which decides on the actual video contents to be transferred to the user.

In such cases of using multiple slices, the different slices may be fully isolated, and their performances may be independent from each other. However, the actual performance of each individual independent slice will affect the same service. This inevitably results in a correlation between the requirements of the different network slices for the same service/application. More specifically:

1. The performance of one slice affects the required Key Performance Indicators (KPIs) of another slice. For instance, in remote driving/AR/VR, the long latency of a video control (direction of view) signal makes the transmission of a HD streamed video from the vehicle site useless.
2. The KPI (e.g. latency) budget is actually shared between different slices. The user experience is affected by the summary of the latencies from multiple slices (e.g. in the above use cases, the latency of the control signaling to the vehicle and the latency of the video/sensor report from the vehicle).

The current 3GPP architecture does not support any cross slice optimization/inter-slice coordination aspects.

Figure 9:
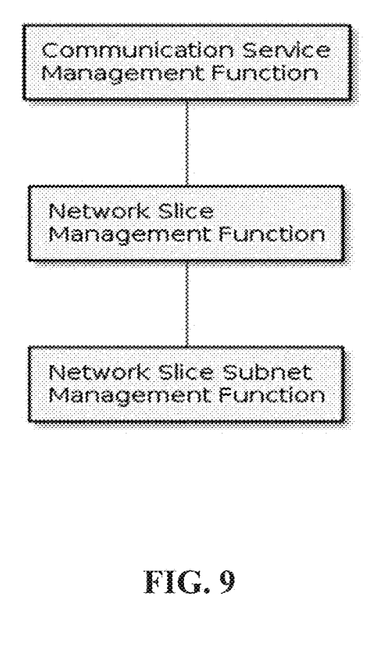
FIG. 9 shows the 3 SA5 Telecom management architecture including CSMF, NSMF, and NSSMF.

The current 3GPP SA5 specifies the Telecom management architecture shown in FIG. 9. The Communication Service Management Function (CSMF) is responsible for translating the communication service related requirements to network slice related requirements. The Network Slice Management Function (NSMF) is responsible for management and orchestration of Network Slice Instances (NSI), and derives network slice subnet related requirements from network slice related requirements. The Network Slice Subnet Management Function (NSSMF) is responsible for management and orchestration of Network Slice Subnet Instances (NSSI).

The current specification focuses on per slice service management (via NSMF and NSSMF). There is, however, no consideration on cross slice optimization based on the service correlation of different slices.

The 5GPPP phase I project 5G-NORMA provides only partial cross slice management and orchestration function by the introduction of an Inter Slice Resource Broker (ISRB). "ISRB handles the allocation of resources of the different slices, their dynamic provisioning and the management of the shared resources among them within the administrative domain it controls". However, this approach focuses only on cross slice resource management, and does not explain how the cross slice management is done across different subnets. Further, the 5GPP phase II project 5G-MoNArch starts the work to map 5G-NORMA architecture into the 3GPP SA5 architecture, and proposes a Cross-slice Orchestration and Management function. However, the detailed design and systematic framework is missing.

SUMMARY

In view of the above-mentioned problems and disadvantages, the present disclosure aims to improve the conventional multi-slice service implementations and approaches. The present disclosure provides a complete framework that supports the optimization of multi-slice services. One particular intention of the present disclosure is to identify and use correlations between slices instances provided for the same service. Further, the disclosure aims at supporting inter-slice optimization considering multiple subnets. Another goal of the present disclosure is the mapping of service requirements into correlated KPIs of multiple associated network slice instances.

In particular the present disclosure proposes some functional enhancements supporting multi-slice services in different layers (levels) of the network architecture, in order to provide a complete framework optimized in view of the multi-slice services. In particular, functional enhancements are provided in the network layer, Management and Orchestration (MANO) layer and the service layer of a network architecture, respectively.

Exploiting service correlations of network slices can help to increase the network efficiency and to improve the user experience.

One embodiment of the present disclosure provides an apparatus for network slicing, configured to determine at least two correlated communication traffic flows for a service; and bind the at least two correlated communication traffic flows and generate binding information.

A communication traffic flow in the sense of this document may be or comprise a Protocol Data Unit (PDU) session, General Packet Radio Services (GPRS) Tunneling Protocol (GTP) data flow, and/or Quality of Service (QoS) flow. A communication traffic flow is particularly for a network slice instance, i.e. related to or part of the network slice instance.

Correlated communication traffic flows are communication network flows that depend on each other with respect to one or more performance parameters. A performance parameter, e.g. a KPI, is a parameter that provides a requirement for a communication network flow, for example, a latency requirement, a bandwidth requirement, a reliability requirement. It can also be a function based on at least one of the aforementioned examples. For example if two communication network flows are correlated with respect to a latency requirement, this can mean that both communication network flows share a latency budget defined by the latency requirement. Two correlated communication traffic flows of two different slice instances inherent the correlation between these two different slice instances.

The binding information includes at least an identifier (ID) of the communication traffic flows.

A service in the sense of this document comprises communication services, e.g. requesting the establishment of one or more communication traffic flows, particularly PDU sessions, requesting the establishment of one or more logical communication networks. With respect to the first aspect, a service may particularly refer to a service requested from the terminal device (e.g. from an individual user of the network).

The apparatus of the embodiment present an important part of a complete framework that is able to support the optimization of multi-slice services. The apparatus is particularly able to identify and expose correlations between slices instances and/or communication traffic flows for the same service. By generating the binding information according to the identified correlation, the apparatus enables cross slice management and optimization, and even enables inter-slice optimization considering multiple subnets. The generated binding information helps significantly to increase the network efficiency as well as to improve the user experience.

In one embodiment, the apparatus is configured to receive a request for a service, in particular from a terminal device, and wherein the determination is based on the request; and/or wherein the determination is based on pre-configured information, in particular from a tenant and/or application and/or the network.

Accordingly, different alternatives are provided for effectively determining the correlation between the at least two communication flows.

In one embodiment, the request and/or the pre-configured information for the service includes information regarding the at least two correlated communication traffic flows. Such information can be any/any combinations of the following: PDU session ID, flow ID, source/destination IP address, source/destination port, application ID, etc.

Accordingly, the apparatus can be directly informed about which communication traffic flows to consider correlated, and thus which flows to bind.

In one embodiment, the request for the service includes information about a session of each of the communication traffic flows and, wherein the request further includes network slice selection assistance information for each session and/or an identity of each session.

In this implementation form the terminal device may determine the different network slices that are to be used for the service. The different network slices base on different communication traffic flows. The session may e.g. be a PDU session. The request may also include information about multiple sessions belonging to one or more communication traffic flows being for the same network slice instance. The network slice selection assistance information may be Single Network Slice Selection Assistance Information (S-NSSAI) specified by 3GPP e.g. as the slice identifier, and indicates the performance correlation between the correspondent communication traffic flows.

In one embodiment, the apparatus is configured to store a list of sessions associated with slice selection assistance information and/or session identities for the at least two correlated communication traffic flows.

Thus, the correlation between the at least two correlated communication traffic flows can be maintained and adapted as required by the apparatus. Any change of the list can be exposed. The above implementation for is in particular employed in the binding of the at least two communication traffic flows.

In one embodiment, the request for the service includes one or more service requirements, and the apparatus is configured to determine the at least two correlated communication traffic flows based on the one or more service requirements.

In this implementation form, the mapping of the service to different network slices, which base on different communication flows, is performed by the apparatus according to the overall service requirements.

In one embodiment, the apparatus is configured to expose the binding information in at least one network layer and/or to at least one other network entity, in particular access network function, core network function, management function, one or more applications, and/or to one or more network functions of the apparatus.

Exposing the binding information means making it available. In particular, the binding information may be exposed directly to a certain entity, function or application, or may be exposed to it indirectly via another network function. Any change in the binding information may be exposed immediately, or the binding information may be exposed regularly. Exposing the binding information allows other network entities to exploit the correlation between the communication traffic flows, in order to improve support for multi-slice services.

In one embodiment, the apparatus is configured to authenticate the received request for the service; and map the service to the at least two correlated communication traffic flows.

In this way, the apparatus may determine the different network slices that are to be used for the service. As mentioned above, this can be triggered by the terminal device or the apparatus, respectively.

In one embodiment, the binding of the at least two correlated communication traffic flows is performed at a network layer, in particular by an Inter Slice Coordination Function (ISCF) of the apparatus.

For the above implementation form, different implementation options are possible at the network layer: As a first option, a new network function can be implemented and connected to the Service Based Architecture (SBA). As a second option, a sub function of an existing network function can be implemented, wherein the network function is connected to the SBA (e.g. Access and Mobility Management Function (AMF), Policy Control Function (PCF) or session management function (SMF)). These functions may particularly be as defined in '3GPP TS23.501 System Architecture for the 5G System, Stage 2 (Rel. 15)'.

Another embodiment of the present disclosure provides an apparatus for network slice management configured to convert a service requirement of a tenant/application into a joint performance parameter in correlated network slice instances; determine a resource allocation for at least one of the network slice instances based on the joint performance parameter.

A service requirement may relate to one or more services. With respect to the second aspect, a service may particularly refer to a communication service requested by a tenant (e.g. a vertical industry which use the operator network) and/or application, in particular an application provided by a customer, for example a vertical industry. A performance parameter—similar as defined above—is a parameter that provides a requirement for one or more network slice instances. It can be in particular a KPI. For example, a performance requirement can be an average latency of all communication traffic flows in a single network slice instance. A KPI may comprise latency, reliability, bandwidth, etc. The correlation of the correlated network slice instances may originate from the correlation of communication traffic flows for those network slice instances, as described above. The communication traffic flows of correlated network slice instances inherent the service requirements (e.g., KPIs) of the correlated network slice instances.

Accordingly, the apparatus of the embodiment achieves a mapping of service requirements into correlated KPIs of multiple associated network slice instances, thus supporting the framework for optimizing multi-slice services. In particular, by exploiting the correlations of network slice instances for resource allocation increases the network efficiency and improve the user experience.

In one embodiment, the apparatus is configured to expose a joint performance parameter to one or more functions in the network layer, in particular a Radio Access Network (RAN) function, PCF, SMF, or AMF.

Thus, these functions can consider the joint performance parameter to e.g. apply cross slice policies (SMF/PCF), apply inter-slice optimization (RAN) or adjust QoS parameters (PCF). Accordingly, the support for multi-slice services can be improved.

In one embodiment, the apparatus is configured to instantiate the at least two correlated network slice instances for the service based on the resource allocation.

The slice instances can serve the same service with an optimized performance, particularly in terms of network efficiency. Thus, a better user experience can be provided.

In one embodiment, the apparatus is configured to instantiate at least two sub-slices in at least one of the correlated network slice instances based on the resource allocation.

Accordingly, the apparatus supports slice instantiation and optimization even considering subnets.

In one embodiment, the apparatus is configured to receive a communication traffic flow binding information from the network layer.

For instance, the apparatus of the second aspect can obtain the binding information form the apparatus of the first aspect. The apparatus of the second aspect can use this binding information to identify the correlated communication traffic flows.

In one embodiment, the apparatus is configured to monitor the joint performance parameter and/or the resource allocation across the at least two correlated network slice instances and/or across two correlated communication traffic flows.

Monitoring the performance parameter and/or per communication traffic flow performance parameter across different slice instances is the pre-requisite for an improved cross slice optimization.

In one embodiment, the apparatus is configured to expose the joint performance parameter and/or the resource allocation across the at least two correlated network slice instances and/or across at least two correlated communication traffic flows to the tenant/application.

For instance, this may be done via a North Bound Interface (NBI). The tenant/application can thus make use of the joint performance parameter.

In one embodiment, the apparatus is configured to apply a joint QoS treatment to the at least two correlated network slice instances and/or the at least two communication traffic flows based on the joint performance parameter and/or binding information.

The QoS treatment can comprise a resource allocation and a network configuration based on the KPI monitoring results. Accordingly, an optimized QoS for the service can be provided.

In one embodiment, the apparatus is configured to manage the at least two correlated network slice instances and/or the at least two sub-slices based on the joint performance parameter and/or the resource allocation, in particular by applying a joint resource management across the at least two correlated network slice instances and/or the at least two sub-slices; and/or perform a service optimization across the at least two correlated network slice instances and/or at least two sub-slices in at least two correlated network slice instances.

Accordingly, optimized support for multi-slice services can be provided, and the user experience can accordingly be improved. One sub-slice can belong to one network slice instance and the other one can belong to another network slice instance.

Yet another embodiment of the present disclosure provides a method for network slicing, comprising determining at least two correlated communication traffic flows for a service; and binding the at least two correlated communication traffic flows and generating binding information.

In one embodiment, the method comprises receiving a request for a service, in particular from a terminal device, and wherein the determination is based on the request; and/or wherein the determination is based on pre-configured information, in particular from a tenant and/or application.

In one embodiment, the request and/or the pre-configured information for the service includes information regarding the at least two correlated communication traffic flows.

In one embodiment, the request for the service includes information about a session of each of the communication traffic flows and, wherein the request further includes network slice selection assistance information for each session and/or an identity of each session In one embodiment, the method comprises storing a list of sessions associated with slice selection assistance information and/or session identities for the at least two correlated communication traffic flows.

In one embodiment, the request for the service includes one or more service requirements, and the apparatus is configured to determine the at least two correlated communication traffic flows based on the one or more service requirements.

In one embodiment, the method comprises exposing the binding information in at least one network layer and/or to at least one other network entity, in particular access network function, core network function, management function, one or more applications, and/or to one or more network functions.

In one embodiment, the method comprises authenticating the received request for the service; and mapping the service to the at least two correlated communication traffic flows.

In one embodiment, the binding of the at least two correlated communication traffic flows is performed at a network layer, in particular by an Inter Slice Coordination Function (ISCF).

The method of the embodiment achieve the same advantages and effects as the apparatus of the first aspect and its respective implementation forms. Also the same definitions and examples apply.

Still another embodiment of the present disclosure provides a method for network slice management, the method comprising converting a service requirement of a tenant/application into a joint performance parameter in correlated network slice instances; and determining a resource allocation for at least one of the network slice instances based on the joint performance parameter.

In one embodiment, the method comprises exposing a joint performance parameter to one or more functions in the network layer, in particular an RAN function, PCF, SMF, or AMF.

In one embodiment, the method comprises instantiating the at least two correlated network slice instances for the service based on the resource allocation.

In one embodiment, the method comprises instantiating at least two sub-slices in at least one of the correlated network slice instances based on the resource allocation.

In one embodiment, the method comprises receiving a communication traffic flow binding information from the network layer.

In one embodiment, the method comprises monitoring the joint performance parameter and/or the resource allocation across the at least two correlated network slice instances and/or across two correlated communication traffic flows.

In one embodiment, the method comprises exposing the joint performance parameter and/or the resource allocation across the at least two correlated network slice instances and/or across at least two correlated communication traffic flows to the tenant/application.

In one embodiment, the method comprises applying a joint QoS treatment to the at least two correlated network slice instances and/or the at least two communication traffic flows based on the joint performance parameter and/or binding information.

In one embodiment, the method comprises managing the at least two correlated network slice instances and/or the at least two sub-slices based on the joint performance parameter and/or the resource allocation, in particular by applying a joint resource management across the at least two correlated network slice instances and/or the at least two sub-slices; and/or performing a service optimization across the at least two correlated network slice instances and/or at least two sub-slices in at least two correlated network slice instances.

The method of the embodiment achieve the same advantages and effects as the apparatus of the second aspect and its respective implementation forms. Also the same definitions and examples apply.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
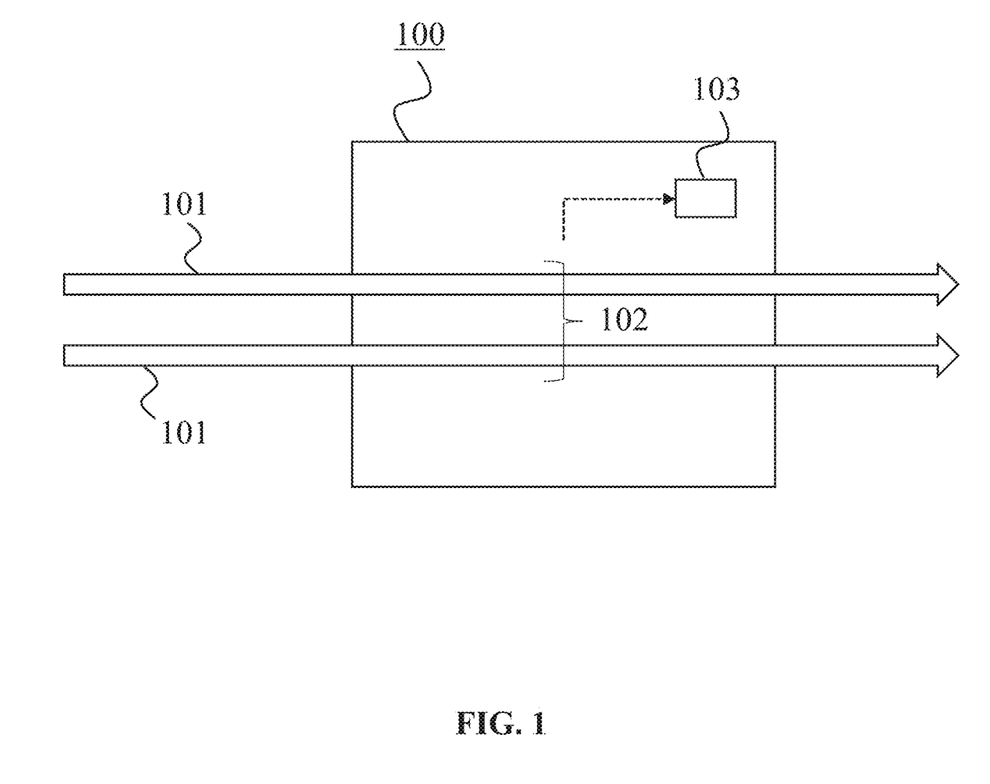
FIG. 1 shows an apparatus for network slicing according to an embodiment of the present disclosure.

FIG. 1 shows an apparatus 100 according to an embodiment. The apparatus 100 is configured for network slicing.

Figure 4:
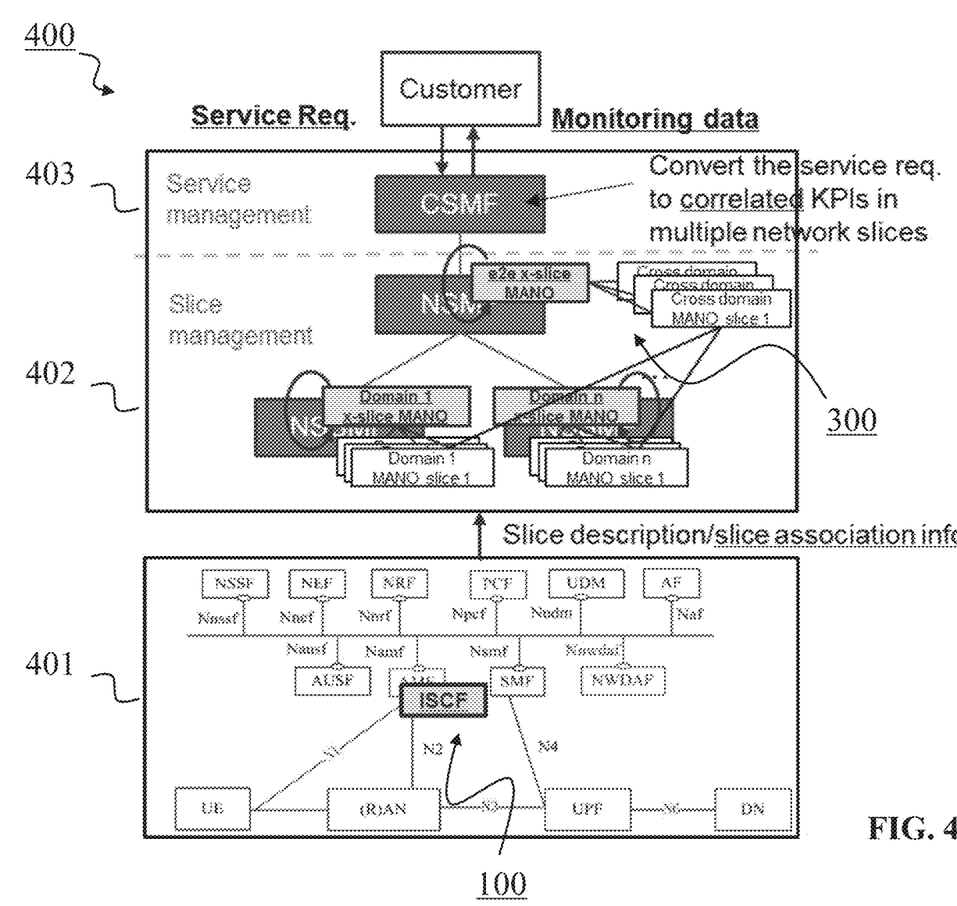
FIG. 4 shows functional enhancements at different network layers and interfaces of the network architecture provided by the framework of the present disclosure.

The apparatus 100 may at least partly be located in a network layer 401 of a network architecture 400 (see FIG. 4).

In particular, the apparatus 100 is configured to determine at least two correlated communication traffic flows 101 for a service. Further, the apparatus 100 is configured to bind 102 the at least two correlated communication traffic flows 101, and to generate binding information 103. The binding information 103 is particularly generated according to the binding of the communication traffic flows 101.

Advantageously, the apparatus 100 can make the generated binding information 103 available, for instance, in at least one network layer and/or to at least one other network entity, in particular an access network function, core network function, management function, one or more applications, and/or to one or more network functions of the apparatus 100. Consequently, the correlation between the communication traffic flows 101 (and accordingly a correlation of network slice instances) can be exploited in the network architecture 400 for optimized multi-slice service support.

Figure 2:
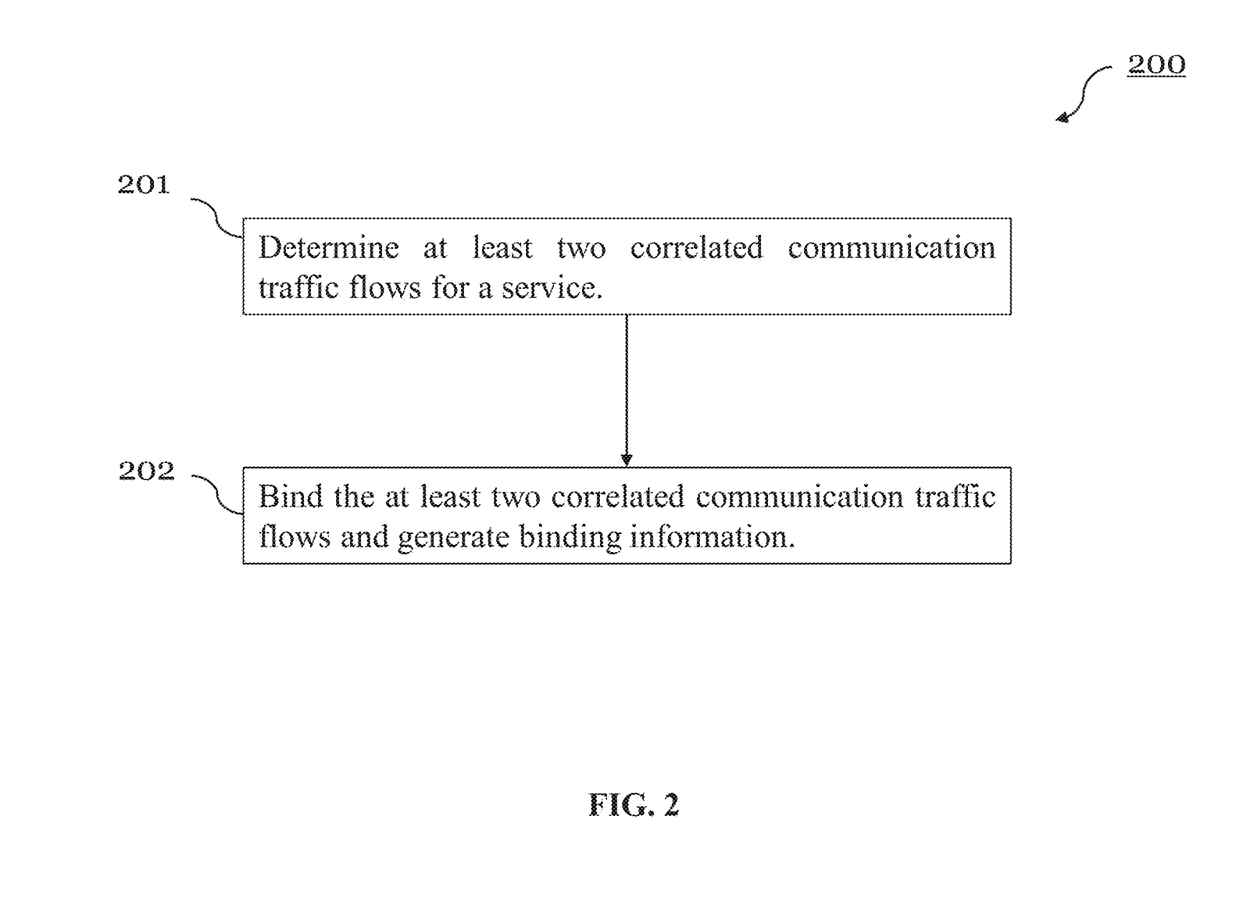
FIG. 2 shows a method for network slicing according to an embodiment of the present disclosure.

FIG. 2 shows a method 200 according to an embodiment, particularly for network slicing. The method 200 can be performed by the apparatus 100 shown in FIG. 1. In particular, the method comprises a step 201 of determining at least two correlated communication traffic flows 101 for a service. Further, it comprises a step 202 of binding 202 the at least two correlated communication traffic flows 101 and generating binding information 102.

Figure 3:
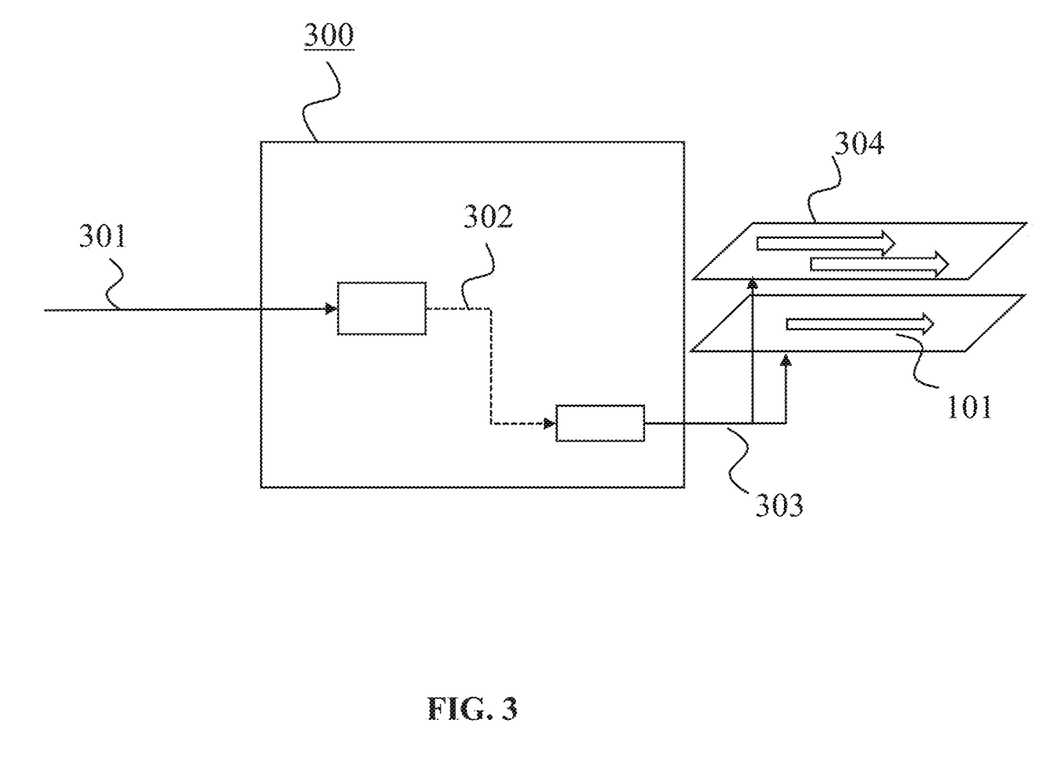
FIG. 3 shows an apparatus for network slice management according to an embodiment of the present disclosure.

FIG. 3 shows an apparatus 300 according to an embodiment. The apparatus 300 is configured for network slice management. The apparatus 300 may be at least partly located in a service layer 403 and/or a MANO layer 402 of a network architecture 400 (see FIG. 4). The apparatus 300 of FIG. 3 and the apparatus 100 of FIG. 1 may be connected to each other in the network architecture 400, particularly for communicating information (e.g. the binding information 102) across different layers 401, 402, 403 of the network architecture 400, or may even form a single apparatus or system spanning multiple layers 401, 402, 403 of the network architecture 400.

The apparatus 300 is in particular configured to convert a service requirement 301 of a tenant/application (relating to a service) into a joint performance parameter 302 in correlated network slice instances 304. Each network slicing instance may comprise at least one communication traffic flow. Further, the apparatus 300 is configured to determine a resource allocation 303 for at least one of the network slice instances 304 (e.g. a resource allocation 303 for at least one communication traffic flow 101 of the at least one network slice instance 304) based on the joint performance parameter 302. Thus, the apparatus 300 supports the optimization of multi-slice services.

FIG. 4 illustrates generally the functional enhancements achieved by implementing the apparatus 100 and the apparatus 300, respectively, into a network architecture 400. In particular, functional enhancements for multi-slice service support are made in different layers 401, 402 and 403 of the network architecture 400. These enhancements include the following:

In the service layer 403, an enhancement of service management function and Service Level Agreement (SLA) for multi-slice service support. In particular, by means of implementing the apparatus 300 (here exemplarily comprising the CSMF), the service requirements 301 of tenants/ applications can be converted into at least one correlated (joint) performance parameter (here a KPI) in correlated network slice instances 304.

The service layer 403 enhances the Service Level Agreement (SLA) regarding the specification of the service requirements 301. For instance, a finer than conventional granularity of service requirements 301 may be defined, which includes: joint KPIs 302 for each of correlated slice instances 304, if a service is going to be implemented by multiple slices; service correlation between associated slice instances 304; as well as the overall service KPIs.

In the MANO layer 402, additional Management and Orchestration (MANO) functions are implemented by means of the apparatus 300 (here exemplarily comprising the NSMF and NSSMF), in order to provide management support for inter-slice optimization (e.g., monitoring/configuration cross slice (x-slice) instances, etc.). In particular, a cross slice MANO function may be defined both at the end-to-end (E2E) level (i.e., E2E x-slice MANO function) and subnet level (i.e., Domain x-slice MANO function). Further, both of the level x-slice functions may be enhanced to support resource management cross associated slice instances 304, KPI monitoring cross associated slice instances 304, and/or inter-slice service optimization cross associated slice instances 304. For this purpose, also new interfaces may be defined (e.g. to itself, and/or to the slice specific MANO functions) as shown in FIG. 4.

For instance, the apparatus 300 located within the MANO layer 402 may monitor the joint performance parameter 302 and/or the resource allocation 303 across at least two correlated network slice instances 304 and/or across two correlated communication traffic flows 101. Further, the apparatus 300 may expose the joint performance parameter 302 and/or the resource allocation 303 across at least two correlated network slice instances 304 and/or at least two correlated communication traffic flows 101 to the tenant/ application. The apparatus 300 may also apply a joint QoS treatment to at least two correlated network slice instances 304 and/or at least two communication traffic flows 101 based on the joint performance parameter 302 and/or the binding information 102 exposed by the apparatus 100. The apparatus 300 may also be configured to manage at least two correlated network slice instances 304 and/or at least two sub-slices based on the joint performance parameter 302 and/or the resource allocation 303 by applying a joint resource management across the at least two correlated network slice instances 304 and/or the at least two sub-slices. The apparatus 300 may also perform a service optimization across at least two correlated network slice instances 304 and/or at least two sub-slices in at least two correlated network slice instances 304.

In the network layer 401, an additional network function is implemented by the apparatus 100 (here comprising exemplarily the ISCF) to provide the associating/binding of at least two correlated communication traffic flows 101 with correlated requirements, and a mechanism to distribute the binding information 102. The apparatus 100 performs the communication traffic flow 101 associating/binding and the generation of the binding information 102 and its exposure (e.g. to different network entities/layers). In particular, the apparatus 100 may provide the binding information 102 from the network layer 401 to the apparatus 300 located in the slice management (MANO) layer 402. Other potential enhancements includes per UE/service/tenant cross slice policies (e.g., PCF) and cross slice context sharing/monitoring data sharing (e.g., NWDAF).

Further, interface enhancement between and within the different network layers 401, 402, 403 of the network architecture 400 are provided for the support/optimization of multi-slice services. The interface enhancements may include the binding information 102 exchange between the network layer 401 and the MANO layer 402 (i.e. slice association information), and/or an extended service requirements/performance report exchange between the service layer 403 and the MANO layer 402 (i.e. Service req. Monitoring data), as shown in FIG. 4.

In the following, the binding of correlated communication traffic flows 101 in the apparatus 100 of FIG. 1 is described in a more detailed example (performed at the ISCF shown in FIG. 4).

The identification of correlated communication traffic flows 101 (like PDU sessions) for different network slice instances 304, is an important pre-condition to perform service based optimization cross the slice instances 304. Thus, the apparatus 100 is advantageously configured to identify correlated communication traffic flows 101, and provide this information as the binding information 102 to other network functions/management plane(s) for service/network performance optimization. It is here assumed that the PCF receives application/service requirements 301 from the AF. The PCF can then decide on one or more flow level/PDU session level cross slice policies, e.g. it can decide on the QoS profile for the associated QoS flows (e.g., ARP, 5QI), and/or decide on the policies for associated PDU sessions (e.g., UPF selection, etc.).

Figure 5:
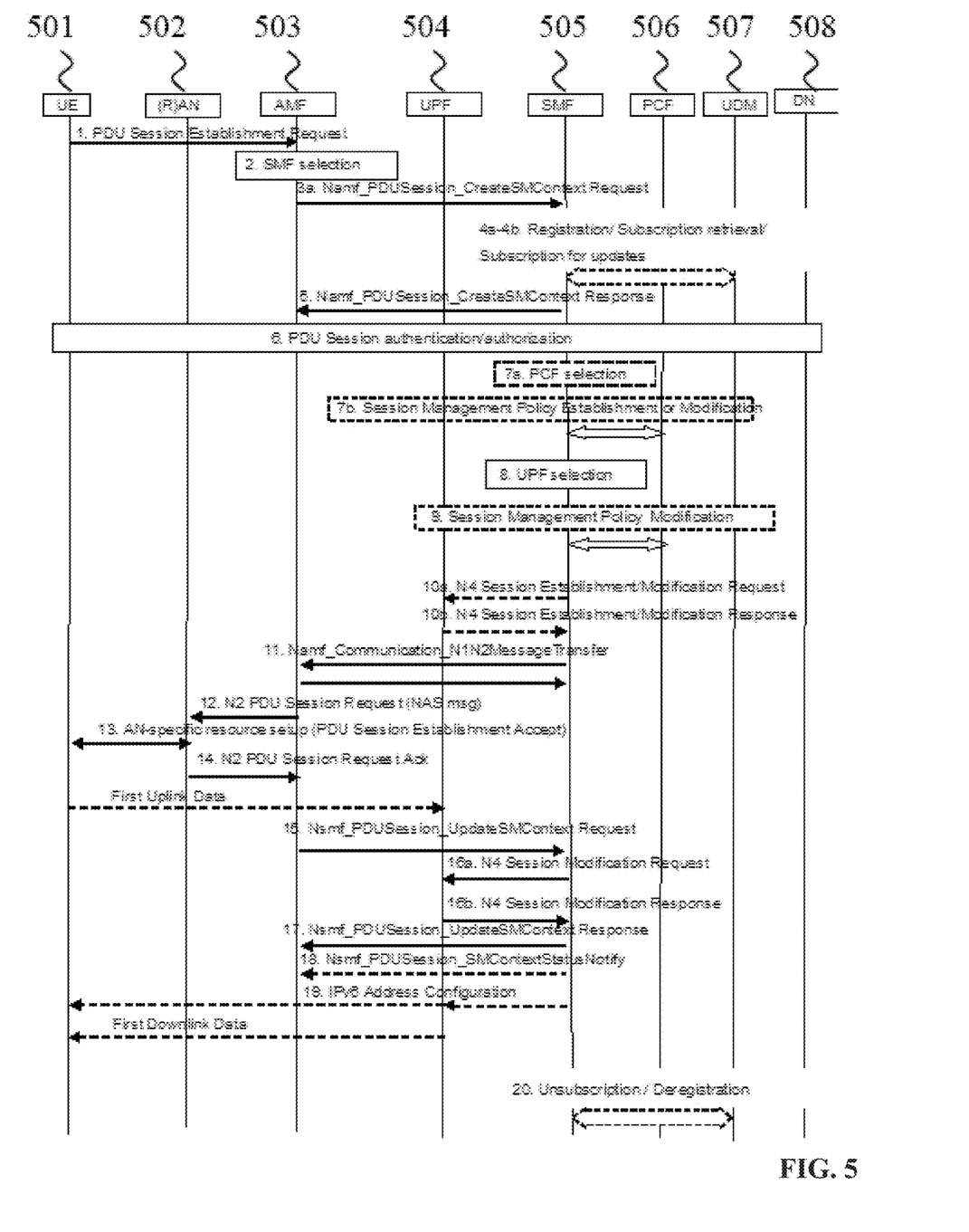
FIG. 5 shows UE-requested PDU Session Establishment for non-roaming and roaming.

FIG. 5 shows as example a User Equipment (UE)-requested PDU Session establishment for non-roaming and roaming with local breakout as defined in 3GPP TS 23.502 V15.0.0 (2017-12). This includes conventionally:

1. "From UE to AMF: NAS Message (S-NSSAI, DNN, PDU Session ID, Request type, Old PDU Session ID, N1 SM container (PDUSession Establishment Request))."
2. "The AMF selects an SMF as described in clause 4.3.2.2.3. If the Request Type indicates "Initial request" or the request is due to handover from EPS, the AMF stores an association of the S-NSSAI, the PDU Session ID and the SMF ID."

For supporting the binding of the correlated communication traffic flows 101 related to network slice instances 304, the following enhancements may be provided according to the present disclosure to the UE session management procedure of FIG. 5:

The UE 501 may sends a PDU session establishment request to the AMF 503 with multiple PDU sessions, and each PDU session may be associated with its own S-NSSAI. For example, one application may have multiple IP addresses and each IP address may be used for one PDU Session with a different NSSAI. The UE 501 may also use a NSSP (Network Slice Selection Policy) to map one application to multiple slices.

An example modification for the conventional UE-requested PDU session Establishment may accordingly be (note underlined):

1. "From UE to AMF: NAS Message (list of (S-NSSAI, DNN, PDU Session ID, Request type, Old PDU Session ID, N1 SM container (PDU Session Establishment Request)))."

In a further implementation, the UE 501 may send a PDU session establishment request to the AMF 502, and may indicate the IDs of the associated PDU sessions.

An example modification for the conventional UE-requested PDU session Establishment may accordingly be (note underlined):

1. "From UE to AMF: NAS Message (S-NSSAI, DNN, PDU Session ID, Request type, Old PDU Session ID, associated PDU session ID(s), N1 SM container (PDU Session Establishment Request))."

The AMF (ISCF) 503 optionally stores a list of correlated PDU session ID, S-NSSAI, SMF ID association.

An example modification for the conventional UE-requested PDU session Establishment may accordingly be (note underlined):

2. "The AMF selects an SMF as described in clause 4.3.2.2.3. If the Request Type indicates "Initial request" or the request is due to handover from EPS, the AMF stores an association of the S-NSSAI, the PDU Session ID and the SMF ID. In case of multiple correlated PDU sessions, AMF stores a list of the aforementioned association."

Next, the providing of the binding information 102 concerning the at least two correlated communication traffic flows 101 of slice instances 304 in the apparatus 100 of FIG. 1 is described in a more detail example with respect to FIG. 5. In this implementation, ISCF is implemented as a sub function of AMF.

The AMF 503 provides the binding information 102 of e.g. correlated PDU sessions to other network entities (e.g. to the PCF 506, the SMF 505, a Network Data Analytics Function (NWDAF), the RAN 502, management plane, etc.).

In an example implementation, the AMF 503 provides the binding information 102 to other network functions using a Service Based Interface (SBI) as is shown in the below table in 3GPP format (note underlined).

| Service Name | Description | Reference in TS 23.502 [3] | Example Consumer(s) |
| --- | --- | --- | --- |
| Namf_Communication | This service enables an NF to communicate with the UE and/or the AN through the AMF. | 5.2.2.2 | SMF, SMSF, PCF, NEF, Peer AMF |
| Namf_EventExposure | This service enables other NFs to subscribe or get notified of the mobility related events and statistics. | 5.2.2.3 | SMF, NEF, PCF, UDM |
| Namf_MT | This service enables an NF to make sure UE is reachable. | 5.2.2.4 | SMSF |
| Namf_ISCF | This service provide slice association for multi-slice service | | SMF, NEF, PCF |

In a further example implementation, the AMF 503 provides this information to SMF 505 using N11 interface. An example modification may accordingly be (note underlined):

3. From AMF to SMF: Either Nsmf_PDUSession_CreateSMContext Request (SUPI, DNN, S-NSSAI, PDU Session ID, associated PDU session ID(s), AMF ID, Request Type, N1 SM container (PDUSession Establishment Request), User location information, Access Type, PEI, GPSI, Subscription For PDU Session Status Notification) or Nsmf_PDUSession_UpdateSMContext Request (SUPI, DNN, S-NSSAI, PDU Session ID, associated PDU session ID(s), AMF ID, Request Type, N1 SM container (PDU Session Establishment Request), User location information, Access Type, RAT type, PEI)."

In another example implementation, the AMF 503 provides this information to RAN 502 using N2 interface. An example modification may accordingly be (note underlined):

12. AMF to (R)AN: N2 PDU Session Request (N2 SM information, associated PDU session ID(s), NAS message (PDU Session ID, N1 SM container (PDU Session Establishment Accept))).

Example usages of the exposed binding information 102 at different network functions may be as follows:

The SMF 505 may identify the instances 304 of correlated QoS flows/PDU sessions (based on the binding information 102 received from the ISCF and based on local QoS flow to PDU session mapping) and may apply cross slice policies from the PCF 506.

The RAN 502 may receive the correlated PDU session binding information 102 from the AMF (ISCF) 503 and may receive a mapping from PDU session to QoS flows from the SMF 505, and may apply inter-slice optimization from the RAN perspective.

Based on the monitored performance from one of the associated (correlated) slice instances 304, the PCF 506 may adjust one or more QoS parameters for the other slice instance 304.

Next, the mapping of a service to logical network slices is described in a more detailed example. This mapping can be either done by the tenants/customers themselves or by the network (particularly the apparatus 100 and/or 300 provided in the network).

The procedure may be as follows, if the mapping is done by the tenant/customer:

1. Operators exposes the network capability in terms of different type of network slices (i.e. network slice as a service). The tenant/customer asks for multiple network slices for its service.
2. The tenant/customer defines one or more per slice service requirements.
3. The tenant/customer requires the network to report the performance of all the slices.
4. In case of a performance change of an individual network slice, the tenant/customer can adjust the requirements for each associated slice considering the E2E service requirements.

The procedure may be as follows, if the mapping is done by the network (particularly the apparatus 100 and/or 300 provided in the network):

1. The tenant/customer defines one or more overall service requirements.
2. The network maps the tenant/customer service to multiple slices (e.g. via CSMF)
3. The network reports the overall performance of the service to the tenant/customer.
4. In case of a performance change of an individual network slice, the network adjusts the requirements for each associated slice Next, a method and procedure for correlated slice instantiation and management considering multiple subnets is described in detail. The details are described with respect to the reference architecture shown in FIG. 6 as an example. A similar procedure, however, can be derived for other architectures (e.g. 3GPP SA5, 5G-MoNArch architecture, 5GPPP architecture WG, etc.).

Figure 6:
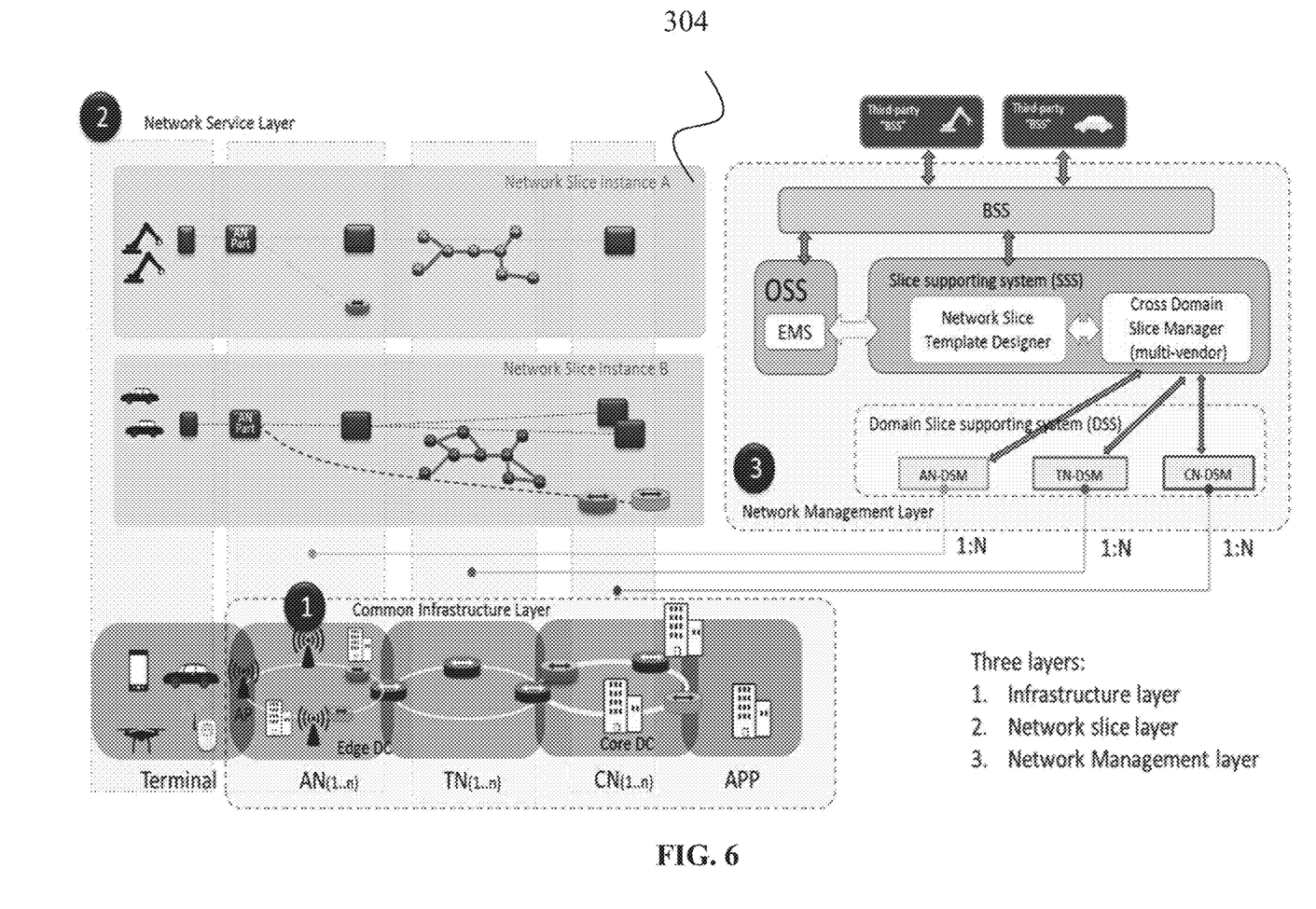
FIG. 6 shows a reference network architecture, to which the present disclosure is applicable.

Step 1: Design a Slice Template (finer granularity service KPIs, e.g., for multiple slices) and onboarding.

Step 2: BSS sends the order (one or multiple associated services) to communication service layer.

Step 3: Communication service layer transfers the order into slice initiation request (including multiple slices and correlation (binding) information 102)

Step 4: For each slice SSS initiate the E2E slice instance 304:
  4.1 Negotiate and confirm the latency quota with each DSM.
  4.2 Get initiation parameters from request, plan pool and inventory and generate E2E slice initiation plan.
  4.3 Separate plan into several domain slice initiation requests (including slice correlation information) and send them to DSMs.

Step 5: DSM initiates the sub-slice instance:
  5.1 Generate sub-slice initiation plan considering slice correlation and fulfill it.
  5.2 Report the initiation process to SSS.

Step 6: SSS Subscribe the KPI from DSMs after instance initiation.

Step 7: DSM reports the KPI to SSS periodically, DSM performs local inter slice optimization considering slice correlation.

Step 8: SSS aggregates KPIs into E2E KPIs and shows them on KPI dashboard, SSS performs cross slice optimization considering slice correlation.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A communication apparatus comprising:
  at least one processor; and
  a non-transitory computer-readable storage medium coupled to the at least one processor and having stored thereon a program including processor-executable instructions which, when being executed by the at least one processor, cause the at least one processor to:
    convert a requirement of a service into a joint performance parameter for at least two network slice instances or at least two correlated communication traffic flows for the service;
    determine at least two correlated communication traffic flows for a service, wherein a joint quality of service (QoS) treatment is applied to the at least two correlated network slice instances or the at least two correlated communication traffic flows based on at least the joint performance parameter or binding information, and wherein the at least two correlated communication traffic flows are correlated by the joint performance parameter; and expose binding information for use in managing the at least two correlated communication traffic flows using the joint performance parameter, wherein the binding information includes identification of the correlated communication traffic flows, wherein the at least two correlated communication traffic flows are bound at a network layer.

2. The apparatus according to claim 1, wherein the program further includes processor-executable instructions for receiving a request for the service, and wherein the processor-executable instructions for determining the at least two correlated communication traffic flows for the service are instructions for determining the at least two correlated communication traffic flows for the service based on at least the request or pre-configured information.

3. The apparatus according to claim 2, wherein at least the request for the service or the pre-configured information includes information regarding the at least two correlated communication traffic flows.

4. The apparatus according to claim 3, wherein the request for the service includes information about a respective session of each of the at least two correlated communication traffic flows, and wherein the request for the service further includes network slice selection assistance information for each respective session and/or an identity of each respective session.

5. The apparatus according to claim 4, wherein the program further includes processor-executable instructions for storing a list of sessions associated with at least network slice selection assistance information or session identities for the at least two correlated communication traffic flows.

6. The apparatus according to claim 2, wherein the request for the service includes one or more service requirements, and wherein the processor-executable instructions for determining the at least two correlated communication traffic flows for the service are instructions for determining the at least two correlated communication traffic flows for the service based on the one or more service requirements.

7. The apparatus according to claim 2, wherein the program further includes processor-executable instructions for:

authenticating the received request for the service; and mapping the service to the at least two correlated communication traffic flows.

8. The apparatus according to claim 1, wherein the program further includes processor-executable instructions for exposing the binding information at least in at least one network layer or to at least one other network entity.

9. The apparatus according to claim 1, wherein each communication traffic flow comprises a packet data unit session, a general packet radio service tunneling protocol data flow, and/or a quality of service flow.

10. The apparatus according to claim 1, wherein the at least two correlated communication traffic flows depend on each other with respect to one or more performance parameters.

11. A communication apparatus comprising:

a non-transitory computer-readable storage medium coupled to a processor and having stored thereon a program including processor-executable instructions which, when being executed by the processor, cause the processor to:

convert a service requirement of a tenant or application into a joint performance parameter for at least two network slice instances or at least two correlated communication traffic flows for the service, wherein the joint performance parameter provides a performance requirement that correlates the two or more network slice instances or the at least two correlated communication traffic flows;

determine a resource allocation for at least one of the correlated network slice instances or at least one of the correlated communication traffic flows based on the joint performance parameter;

expose binding information for use in managing the correlated at least two network slices or the at least two correlated communication traffic flows, wherein the binding information includes identification of the correlated communication traffic flows;

monitor at least the joint performance parameter or a resource allocation at least across the at least two correlated network slice instances or across the two correlated communication traffic flows; and apply a joint quality of service (QoS) treatment to the at least two correlated network slice instances or the at least two communication traffic flows based on at least the joint performance parameter or the binding information, wherein the at least two correlated communication traffic flows are bound at a network layer.

12. The apparatus according to claim 11, wherein the program further includes processor-executable instructions for exposing the joint performance parameter to one or more functions in the network layer.

13. The apparatus according to claim 11, wherein the program further includes processor-executable instructions for instantiating the at least two correlated network slice instances for a service based on the resource allocation.

14. The apparatus according to claim 11, wherein the program further includes processor-executable instructions for instantiating at least two sub-slices in at least one of the at least two correlated network slice instances based on the resource allocation.

15. The apparatus according to claim 14, wherein the program further includes processor-executable instructions for:

managing the at least two correlated network slice instances or the at least two sub-slices based on at least the joint performance parameter or the resource allocation by applying a joint resource management across the at least two correlated network slice instances or the at least two sub-slices; or performing a service optimization across the at least two correlated network slice instances or at least two sub-slices in at least two correlated network slice instances.

16. The apparatus according to claim 11, wherein the program further includes processor-executable instructions for receiving communication traffic flow binding information from the network layer, wherein the binding information includes the communication traffic flow binding information.

17. The apparatus according to claim 11, wherein the exposed binding information includes at least the joint performance parameter or the resource allocation and the binding information is exposed at least across the at least two correlated network slice instances or across at least two correlated communication traffic flows to the tenant or application.

18. The apparatus according to claim 11, wherein the performance requirement is a latency requirement, a bandwidth requirement, or a reliability requirement.

19. A communication method comprising:
   converting a requirement of a service into a joint performance parameter for at least two network slice instances or at least two correlated communication traffic flows for the service;
   determining at least two correlated communication traffic flows for a service,
      wherein a joint quality of service (QoS) treatment is applied to the at least two correlated network slice instances or the at least two correlated communication traffic flows based on at least the joint performance parameter or binding information, and
      wherein the at least two correlated communication traffic flows are correlated by the joint performance parameter; and
   exposing binding information for use in managing the at least two correlated communication traffic flows using the joint performance parameter, wherein the binding information includes identification of the correlated communication traffic flows, wherein the at least two correlated communication traffic flows are bound at a network layer.

* * * * *